(12) United States Patent
Kirley et al.

(10) Patent No.: US 8,719,091 B2
(45) Date of Patent: May 6, 2014

(54) SYSTEM, METHOD AND COMPUTER PROGRAM FOR DETERMINING TAGS TO INSERT IN COMMUNICATIONS

(75) Inventors: Mark Kirley, Twyford (GB); Geoffrey Morley, London (GB)

(73) Assignee: Apple Inc., Cupertino, CA (US)

( * ) Notice: Subject to any disclaimer, the term of this patent is extended or adjusted under 35 U.S.C. 154(b) by 821 days.

(21) Appl. No.: 12/287,645

(22) Filed: Oct. 10, 2008

(65) Prior Publication Data

US 2009/0099906 A1  Apr. 16, 2009

Related U.S. Application Data

(60) Provisional application No. 60/999,004, filed on Oct. 15, 2007.

(30) Foreign Application Priority Data

Feb. 25, 2008 (GB) .................................. 0803273.2

(51) Int. Cl.
*G06Q 30/00* (2012.01)
(52) U.S. Cl.
USPC .................. 705/14.49; 705/14.66; 705/14.72; 705/14.73
(58) Field of Classification Search
USPC ...................... 705/14.49, 14.66, 14.72, 14.73
See application file for complete search history.

(56) References Cited

U.S. PATENT DOCUMENTS

| 5,408,519 A | 4/1995 | Pierce et al. |
| 5,459,306 A | 10/1995 | Stein et al. |
| 5,600,364 A | 2/1997 | Hendricks et al. |
| 5,613,213 A | 3/1997 | Naddell et al. |
| 5,678,179 A | 10/1997 | Turcotte et al. |
| 5,978,775 A | 11/1999 | Chen |
| 5,978,833 A | 11/1999 | Pashley et al. |
| 6,006,197 A | 12/1999 | d'Eon et al. |
| 6,009,410 A | 12/1999 | LeMole et al. |

(Continued)

FOREIGN PATENT DOCUMENTS

| BE | 1015704 | 7/2005 |
| DE | 199 41 461 A1 | 3/2001 |

(Continued)

OTHER PUBLICATIONS

Definition of "user" at the Free On-Line Dictionary of Computing, Denis Howe 2010.*

(Continued)

*Primary Examiner* — Elaine Gort
*Assistant Examiner* — Peter L Ludwig
(74) *Attorney, Agent, or Firm* — Novak Druce Connolly Bove + Quigg LLP

(57) ABSTRACT

A method for adding a tag to a message deliverable to a communication device includes monitoring communications to the device to identify a communication with which a tag can be associated. For identified communications with which a tag can be associated, the method includes analyzing at least one of data about the content of the communication, profile data about at least one of the recipient or sender of the communication, data about a commercial relationship between an operator managing communications to the device and an Internet service provider of tags, and data about popularity of an internet site, and selecting a tag to associate with the communication based on the data analysis.

42 Claims, 3 Drawing Sheets

(56) References Cited

U.S. PATENT DOCUMENTS

| | | |
|---|---|---|
| 6,023,700 A | 2/2000 | Owens et al. |
| 6,055,512 A | 4/2000 | Dean et al. |
| 6,055,513 A | 4/2000 | Katz et al. |
| 6,057,872 A | 5/2000 | Candelore |
| 6,097,942 A | 8/2000 | Laiho |
| 6,253,189 B1 | 6/2001 | Feezell et al. |
| 6,286,005 B1 | 9/2001 | Cannon |
| 6,334,145 B1 | 12/2001 | Adams et al. |
| 6,338,044 B1 | 1/2002 | Cook et al. |
| 6,345,279 B1 | 2/2002 | Li et al. |
| 6,381,465 B1 | 4/2002 | Chern et al. |
| 6,393,407 B1 | 5/2002 | Middleton, III et al. |
| 6,405,243 B1 | 6/2002 | Nielsen |
| 6,408,309 B1 | 6/2002 | Agarwal |
| 6,446,261 B1 | 9/2002 | Rosser |
| 6,502,076 B1 | 12/2002 | Smith |
| 6,684,249 B1 | 1/2004 | Frerichs et al. |
| 6,690,394 B1 | 2/2004 | Harui |
| 6,698,020 B1 | 2/2004 | Zigmond et al. |
| 6,718,551 B1 | 4/2004 | Swix et al. |
| 6,738,978 B1 | 5/2004 | Hendricks et al. |
| 6,795,808 B1 | 9/2004 | Strubbe et al. |
| 6,886,000 B1 | 4/2005 | Aggarwal et al. |
| 6,920,326 B2 | 7/2005 | Agarwal et al. |
| 6,990,462 B1 | 1/2006 | Wilcox et al. |
| 7,039,599 B2 | 5/2006 | Merriman et al. |
| 7,072,947 B1 | 7/2006 | Knox et al. |
| 7,149,537 B1 | 12/2006 | Kupsh et al. |
| 7,168,084 B1 | 1/2007 | Hendricks et al. |
| 7,203,684 B2 | 4/2007 | Carobus et al. |
| 7,280,818 B2 | 10/2007 | Clayton |
| 7,356,477 B1 | 4/2008 | Allan et al. |
| 7,370,002 B2 | 5/2008 | Heckerman et al. |
| 7,539,652 B2 | 5/2009 | Flinn et al. |
| 7,558,559 B2 | 7/2009 | Alston |
| 7,669,212 B2 | 2/2010 | Alao et al. |
| 7,685,019 B2 | 3/2010 | Collins |
| 7,730,017 B2 | 6/2010 | Nance et al. |
| 7,734,632 B2 | 6/2010 | Wang |
| 7,747,676 B1 | 6/2010 | Nayfeh et al. |
| 7,870,576 B2 | 1/2011 | Eldering |
| 7,882,518 B2 | 2/2011 | Finseth et al. |
| 7,903,099 B2 | 3/2011 | Baluja |
| 7,912,843 B2 | 3/2011 | Murdock et al. |
| 7,984,014 B2 | 7/2011 | Song et al. |
| 8,046,797 B2 | 10/2011 | Bentolila et al. |
| 8,060,406 B2 | 11/2011 | Blegen |
| 8,191,098 B2 | 5/2012 | Cooper et al. |
| 8,229,786 B2 | 7/2012 | Cetin et al. |
| 8,380,562 B2 | 2/2013 | Toebes et al. |
| 2001/0044739 A1 | 11/2001 | Bensemana |
| 2001/0047272 A1 | 11/2001 | Frietas et al. |
| 2001/0051925 A1 | 12/2001 | Kang |
| 2002/0006803 A1 | 1/2002 | Mendiola et al. |
| 2002/0016736 A1 | 2/2002 | Cannon et al. |
| 2002/0019829 A1 | 2/2002 | Shapiro |
| 2002/0021809 A1 | 2/2002 | Salo et al. |
| 2002/0052781 A1 | 5/2002 | Aufricht et al. |
| 2002/0075305 A1 | 6/2002 | Beaton et al. |
| 2002/0077130 A1 | 6/2002 | Owensby |
| 2002/0078147 A1 | 6/2002 | Bouthors et al. |
| 2002/0083411 A1 | 6/2002 | Bouthors et al. |
| 2002/0099842 A1 | 7/2002 | Jennings et al. |
| 2002/0120498 A1 | 8/2002 | Gordon et al. |
| 2002/0137507 A1 | 9/2002 | Winkler |
| 2002/0138291 A1 | 9/2002 | Vaidyanathan et al. |
| 2002/0161770 A1 | 10/2002 | Shapiro et al. |
| 2002/0164977 A1 | 11/2002 | Link, II et al. |
| 2002/0165773 A1 | 11/2002 | Natsumo et al. |
| 2002/0175935 A1 | 11/2002 | Wang et al. |
| 2003/0003935 A1 | 1/2003 | Vesikivi et al. |
| 2003/0023489 A1 | 1/2003 | McGuire et al. |
| 2003/0040297 A1 | 2/2003 | Pecen et al. |
| 2003/0040300 A1 | 2/2003 | Bodic et al. |
| 2003/0083931 A1 | 5/2003 | Lang |
| 2003/0101454 A1 | 5/2003 | Ozer et al. |
| 2003/0126015 A1 | 7/2003 | Chan et al. |
| 2003/0126146 A1 | 7/2003 | Var Der Riet |
| 2003/0130887 A1 | 7/2003 | Nathaniel |
| 2003/0154300 A1 | 8/2003 | Mostafa |
| 2003/0182567 A1 | 9/2003 | Barton et al. |
| 2003/0188017 A1 | 10/2003 | Nomura |
| 2003/0191689 A1 | 10/2003 | Bosarge et al. |
| 2003/0197719 A1 | 10/2003 | Lincke et al. |
| 2004/0003398 A1 | 1/2004 | Donian et al. |
| 2004/0043777 A1 | 3/2004 | Brouwer et al. |
| 2004/0045029 A1 | 3/2004 | Matsuura |
| 2004/0054576 A1 | 3/2004 | Kanerva et al. |
| 2004/0068435 A1 | 4/2004 | Braunzell |
| 2004/0133480 A1 | 7/2004 | Domes |
| 2004/0136358 A1 | 7/2004 | Hind et al. |
| 2004/0158858 A1 | 8/2004 | Paxton et al. |
| 2004/0185883 A1 | 9/2004 | Rukman |
| 2004/0192359 A1 | 9/2004 | McRaild et al. |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0240649 A1 | 12/2004 | Goel |
| 2004/0259526 A1 | 12/2004 | Goris et al. |
| 2005/0010641 A1 | 1/2005 | Staack |
| 2005/0021397 A1 | 1/2005 | Cui et al. |
| 2005/0060425 A1 | 3/2005 | Yeh et al. |
| 2005/0071224 A1* | 3/2005 | Fikes et al. ............... 705/14 |
| 2005/0075929 A1 | 4/2005 | Wolinsky et al. |
| 2005/0125397 A1 | 6/2005 | Gross et al. |
| 2005/0138140 A1 | 6/2005 | Wen et al. |
| 2005/0228680 A1 | 10/2005 | Malik |
| 2005/0228797 A1 | 10/2005 | Koningstein et al. |
| 2005/0229209 A1 | 10/2005 | Hildebolt et al. |
| 2005/0239495 A1 | 10/2005 | Bayne |
| 2005/0239504 A1 | 10/2005 | Ishii et al. |
| 2005/0249216 A1 | 11/2005 | Jones |
| 2005/0267798 A1 | 12/2005 | Panara |
| 2005/0273465 A1 | 12/2005 | Kimura |
| 2005/0273833 A1 | 12/2005 | Soinio |
| 2005/0289113 A1 | 12/2005 | Bookstaff |
| 2006/0031327 A1 | 2/2006 | Kredo |
| 2006/0040642 A1 | 2/2006 | Boris et al. |
| 2006/0048059 A1 | 3/2006 | Etkin |
| 2006/0059133 A1 | 3/2006 | Moritani |
| 2006/0068845 A1 | 3/2006 | Muller et al. |
| 2006/0075425 A1 | 4/2006 | Koch et al. |
| 2006/0095511 A1 | 5/2006 | Munarriz et al. |
| 2006/0117378 A1 | 6/2006 | Tam et al. |
| 2006/0123014 A1 | 6/2006 | Ng |
| 2006/0129455 A1 | 6/2006 | Shah |
| 2006/0141923 A1 | 6/2006 | Goss |
| 2006/0161520 A1 | 7/2006 | Brewer et al. |
| 2006/0167747 A1 | 7/2006 | Goodman et al. |
| 2006/0168616 A1 | 7/2006 | Candelore |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0276170 A1 | 12/2006 | Radhakrishnan et al. |
| 2006/0276213 A1 | 12/2006 | Gottschalk et al. |
| 2006/0282319 A1 | 12/2006 | Maggio |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004333 A1 | 1/2007 | Kavanti |
| 2007/0011344 A1 | 1/2007 | Paka et al. |
| 2007/0016743 A1 | 1/2007 | Jevans |
| 2007/0022021 A1 | 1/2007 | Walker et al. |
| 2007/0027703 A1 | 2/2007 | Hu et al. |
| 2007/0027760 A1 | 2/2007 | Collins et al. |
| 2007/0027762 A1 | 2/2007 | Collins et al. |
| 2007/0037562 A1 | 2/2007 | Smith-Kerker et al. |
| 2007/0047523 A1 | 3/2007 | Jiang |
| 2007/0061195 A1 | 3/2007 | Liu et al. |
| 2007/0061300 A1 | 3/2007 | Ramer et al. |
| 2007/0067215 A1 | 3/2007 | Agarwal et al. |

(56) References Cited

U.S. PATENT DOCUMENTS

| | | |
|---|---|---|
| 2007/0072631 A1 | 3/2007 | Mock et al. |
| 2007/0074262 A1 | 3/2007 | Kikkoji et al. |
| 2007/0078712 A1 | 4/2007 | Ott et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0094066 A1 | 4/2007 | Kumar et al. |
| 2007/0100651 A1 | 5/2007 | Ramer et al. |
| 2007/0100805 A1 | 5/2007 | Ramer et al. |
| 2007/0105536 A1 | 5/2007 | Tingo, Jr. |
| 2007/0113243 A1 | 5/2007 | Brey |
| 2007/0117571 A1 | 5/2007 | Musial |
| 2007/0118592 A1 | 5/2007 | Bachenberg |
| 2007/0136457 A1 | 6/2007 | Dai et al. |
| 2007/0149208 A1 | 6/2007 | Syrbe et al. |
| 2007/0156534 A1 | 7/2007 | Lerner et al. |
| 2007/0180147 A1 | 8/2007 | Leigh |
| 2007/0192409 A1 | 8/2007 | Kleinstern et al. |
| 2007/0198485 A1* | 8/2007 | Ramer et al. ............ 707/3 |
| 2007/0208619 A1 | 9/2007 | Branam et al. |
| 2007/0214470 A1 | 9/2007 | Glasgow et al. |
| 2007/0233671 A1 | 10/2007 | Oztekin et al. |
| 2007/0244750 A1 | 10/2007 | Grannan et al. |
| 2007/0260624 A1 | 11/2007 | Chung et al. |
| 2007/0288950 A1 | 12/2007 | Downey et al. |
| 2007/0290787 A1 | 12/2007 | Fiatal et al. |
| 2008/0004046 A1 | 1/2008 | Mumick et al. |
| 2008/0004958 A1 | 1/2008 | Ralph et al. |
| 2008/0013537 A1 | 1/2008 | Dewey et al. |
| 2008/0032703 A1 | 2/2008 | Krumm et al. |
| 2008/0032717 A1 | 2/2008 | Sawada et al. |
| 2008/0040175 A1* | 2/2008 | Dellovo ............ 705/7 |
| 2008/0052158 A1 | 2/2008 | Ferro et al. |
| 2008/0065491 A1 | 3/2008 | Bakman |
| 2008/0070579 A1 | 3/2008 | Kankar et al. |
| 2008/0071875 A1 | 3/2008 | Koff et al. |
| 2008/0071929 A1 | 3/2008 | Motte et al. |
| 2008/0082686 A1 | 4/2008 | Schmidt et al. |
| 2008/0091796 A1 | 4/2008 | Story |
| 2008/0133344 A1 | 6/2008 | Hyder et al. |
| 2008/0140508 A1 | 6/2008 | Anand et al. |
| 2008/0228568 A1 | 9/2008 | Williams et al. |
| 2008/0243619 A1 | 10/2008 | Sharman et al. |
| 2008/0249832 A1 | 10/2008 | Richardson et al. |
| 2008/0262927 A1 | 10/2008 | Kanayama et al. |
| 2008/0271068 A1 | 10/2008 | Ou et al. |
| 2008/0281606 A1 | 11/2008 | Kitts et al. |
| 2008/0288476 A1 | 11/2008 | Kim et al. |
| 2008/0319836 A1 | 12/2008 | Aaltonen et al. |
| 2009/0006194 A1 | 1/2009 | Sridharan et al. |
| 2009/0029721 A1 | 1/2009 | Doraswamy |
| 2009/0049090 A1 | 2/2009 | Shenfield et al. |
| 2009/0063249 A1 | 3/2009 | Tomlin et al. |
| 2009/0106111 A1 | 4/2009 | Walk et al. |
| 2009/0125377 A1 | 5/2009 | Somji et al. |
| 2009/0132395 A1 | 5/2009 | Lam et al. |
| 2009/0138304 A1 | 5/2009 | Aharoni et al. |
| 2009/0197619 A1 | 8/2009 | Colligan et al. |
| 2009/0216847 A1 | 8/2009 | Krishnaswamy et al. |
| 2009/0240677 A1 | 9/2009 | Parekh et al. |
| 2009/0275315 A1 | 11/2009 | Alston |
| 2009/0286520 A1 | 11/2009 | Nielsen et al. |
| 2009/0298483 A1 | 12/2009 | Bratu et al. |
| 2010/0030647 A1 | 2/2010 | Shahshahani |
| 2010/0082397 A1 | 4/2010 | Blegen |
| 2010/0082423 A1 | 4/2010 | Nag et al. |
| 2010/0088152 A1 | 4/2010 | Bennett |
| 2010/0114654 A1 | 5/2010 | Lukose et al. |
| 2010/0125505 A1 | 5/2010 | Puttaswamy |
| 2010/0138271 A1 | 6/2010 | Henkin |
| 2010/0153216 A1 | 6/2010 | Liang et al. |
| 2010/0161424 A1 | 6/2010 | Sylvain |
| 2010/0169157 A1 | 7/2010 | Muhonen et al. |
| 2010/0169176 A1 | 7/2010 | Turakhia |
| 2011/0106840 A1 | 5/2011 | Barrett et al. |
| 2011/0209067 A1 | 8/2011 | Bogess et al. |
| 2011/0276401 A1 | 11/2011 | Knowles et al. |

FOREIGN PATENT DOCUMENTS

| | | |
|---|---|---|
| DE | 10061984 A1 | 6/2002 |
| EP | 1061465 | 12/2000 |
| EP | 1 073 293 A1 | 1/2001 |
| EP | 1 109 371 A2 | 6/2001 |
| EP | 1107137 | 6/2001 |
| EP | 1109371 | 6/2001 |
| EP | 2 369 218 A | 5/2002 |
| EP | 1 220 132 A2 | 7/2002 |
| EP | 1 239 392 A2 | 9/2002 |
| EP | 1280087 | 1/2003 |
| EP | 1 365 604 A2 | 11/2003 |
| EP | 1 408 705 A1 | 4/2004 |
| EP | 1 455 511 A1 | 9/2004 |
| EP | 1509024 | 2/2005 |
| EP | 1528827 | 5/2005 |
| EP | 1 542 482 A2 | 6/2005 |
| EP | 1 587 332 A1 | 10/2005 |
| EP | 1 615 455 A1 | 1/2006 |
| EP | 1 633 100 A1 | 3/2006 |
| EP | 1 677 475 A1 | 7/2006 |
| EP | 1772822 | 4/2007 |
| GB | 2343051 | 4/2000 |
| GB | 2372867 | 9/2002 |
| GB | 2 406 996 A | 4/2005 |
| GB | 2406996 | 4/2005 |
| GB | 2 414 621 A2 | 11/2005 |
| GB | 2414621 | 11/2005 |
| GB | 2424546 | 9/2006 |
| JP | 2002-140272 | 5/2002 |
| JP | 2007-087138 A | 4/2007 |
| JP | 2007087138 | 4/2007 |
| JP | 2007-199821 A | 8/2007 |
| JP | 2007199821 | 8/2007 |
| KR | 20060011760 | 7/2004 |
| WO | WO 96/24213 | 8/1996 |
| WO | 98/21713 | 5/1998 |
| WO | 00/00916 | 1/2000 |
| WO | 00/30002 | 5/2000 |
| WO | WO 00/44151 A2 | 7/2000 |
| WO | WO 01/22748 A | 3/2001 |
| WO | WO 01/22748 A1 | 3/2001 |
| WO | WO 01/31497 A1 | 5/2001 |
| WO | 01/44977 | 6/2001 |
| WO | WO 01/52161 A2 | 7/2001 |
| WO | 01/63423 | 8/2001 |
| WO | WO 01/57705 A1 | 8/2001 |
| WO | WO 01/58178 A2 | 8/2001 |
| WO | WO 01/65411 A1 | 9/2001 |
| WO | WO 01/69406 A1 | 9/2001 |
| WO | WO 01/71949 A1 | 9/2001 |
| WO | WO 01/72063 A1 | 9/2001 |
| WO | WO 01/91400 A2 | 11/2001 |
| WO | WO 01/93551 A2 | 12/2001 |
| WO | WO 01/97539 A2 | 12/2001 |
| WO | 02/09431 | 1/2002 |
| WO | WO 02/31624 A2 | 4/2002 |
| WO | 02/44989 | 6/2002 |
| WO | WO 02/054803 A | 7/2002 |
| WO | WO 02/054803 A1 | 7/2002 |
| WO | WO 02/069585 A2 | 9/2002 |
| WO | WO 02/069651 A1 | 9/2002 |
| WO | WO 02/075574 A1 | 9/2002 |
| WO | 02/086664 | 10/2002 |
| WO | WO 02/084895 A1 | 10/2002 |
| WO | 02/096056 | 11/2002 |
| WO | WO 03/015430 A1 | 2/2003 |
| WO | WO 03/019845 A2 | 3/2003 |
| WO | WO 03/024136 A1 | 3/2003 |
| WO | WO 03/049461 A2 | 6/2003 |
| WO | WO 03/088690 A1 | 10/2003 |
| WO | WO 2004/084532 A1 | 9/2004 |
| WO | WO 2004/086791 A1 | 10/2004 |
| WO | 2004/100470 | 11/2004 |

(56) References Cited

FOREIGN PATENT DOCUMENTS

| WO | WO 2004/100470 A | 11/2004 |
|---|---|---|
| WO | WO 2004/100470 A1 | 11/2004 |
| WO | WO 2004/100521 A1 | 11/2004 |
| WO | WO 2004/102993 A1 | 11/2004 |
| WO | WO 2004/104867 A2 | 12/2004 |
| WO | 2005/020578 | 3/2005 |
| WO | WO 2005/029769 A1 | 3/2005 |
| WO | 2005/073863 | 8/2005 |
| WO | WO 2005/076650 A1 | 8/2005 |
| WO | 2006/005001 | 1/2006 |
| WO | WO 2006/002869 A1 | 1/2006 |
| WO | WO 2006/005001 A2 | 1/2006 |
| WO | WO 2006/016189 A1 | 2/2006 |
| WO | 2006/024003 | 3/2006 |
| WO | WO 2006/027407 A1 | 3/2006 |
| WO | WO 2006/040749 A1 | 4/2006 |
| WO | WO 2006/093284 A1 | 9/2006 |
| WO | WO 2006/119481 A2 | 11/2006 |
| WO | 2007/001118 | 1/2007 |
| WO | 2007/002025 | 1/2007 |
| WO | 2007/060451 | 5/2007 |
| WO | 2007/091089 | 8/2007 |
| WO | 2007/103263 | 9/2007 |
| WO | WO 2008/013437 A1 | 1/2008 |
| WO | 2008/024852 | 2/2008 |
| WO | 2008/045867 | 4/2008 |
| WO | WO 2008/045867 A1 | 4/2008 |
| WO | 2008/147919 | 12/2008 |
| WO | WO 2008/147919 A1 | 12/2008 |
| WO | 2009/009507 | 1/2009 |
| WO | 2009/032856 | 3/2009 |
| WO | 2009/061914 | 5/2009 |
| WO | 2009/077888 | 6/2009 |
| WO | 2009/099876 | 8/2009 |
| WO | 2009/158097 | 12/2009 |

OTHER PUBLICATIONS definition of "message" at Randomhouse Dictionary, Random House 2011.*
definition of "relevant", World English Dictionary (1998).*
definition of "dynamic", SCience Dictionary (2002).*
Search Report under Section 17 dated Jul. 7, 2008 in related U.K. Application GB 0803273.2.
Examination Report dated Jun. 17, 2009 issued in counterpart U.K. Application No. GB0803273.2 by the U.K. Intellectual Property Office (4 pages).
International Search Report and Written Opinion of the International Searching Authority mailed Feb. 11, 2009, issued by the International Searching Authority in related International Application PCT/EP2008/063839 (11 pages).
"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010)., Jul. 24, 2006.
"Combined Search and Examination Report", for United Kingdom Patent Application No. GB 0816228.1 dated Jan. 2009, Jan. 6, 2009.
"Combined Search and Examination Report dated Mar. 7, 2008", for United Kingdom Patent Application No. GB 0721863.9, Mar. 7, 2008.
"Communication (Combined Search and Examination Report under Sections 17 and 18(3)) dated Jan. 30, 2009 issued from the United Kingdom Patent Office", in related United Kingdom Application No. GB 0818145.5 (8 pages), Jan. 30, 2009.
"Communication (European Search Report) dated Jun. 26, 2008", in European Patent Application No. EP 08101394, Jun. 26, 2008.
"Communication (European Search Report) dated Oct. 17, 2008 issued by the European Patent Office", in counterpart European Patent Application EP 08156763, Oct. 17, 2008.
"Communication (International Search Report along with Written Opinion of International Searching Authority) mailed Oct. 8, 2008 issued by the International Searching Authority", in counterpart International Application PCT/EP 2008/056342, Oct. 8, 2008.
"Communication (Notification Concerning Transmittal of International Preliminary Report on Patentability, International Preliminary Report on Patentability, and Written Opinion of the International Searching Authority)", issued in connection with related International Application PCT/EP 2008/051489 and mailed on Sep. 24, 2009 (6 pages), Sep. 24, 2009.
"Communication (Search Report under Section 17 along with Examination Report under Section 18(3)) dated Oct. 6, 2008 issued by the United Kingdom Intellectual Property Office", in counterpart U.K. Application GB 0809321.3, Oct. 6, 2008.
"Communication Pursuant to Article 94(3) EPC (European Examination Report) dated Oct. 23, 2008", issued in counterpart European Patent Application No. EP 08101394.8-1238, Oct. 23, 2008.
"Examination Report", for counterpart European Patent Applicaiton No. 08153257.4 issued Jun. 2, 2009.
"Examination Report dated Sep. 11, 2009", for European Patent Application No. EP 08159355.0, Sep. 11, 2009.
"International Preliminary Report on Patentability and Written Opinion issued Nov. 24, 2009", in International Application PCT/EP 2008/056342 ,Nov. 24, 2009.
"International Search Report", for International Application No. PCT/FI 2006/050455, dated Jul. 25, 2007.
"International Search Report and Written Opinion mailed on Aug. 26, 2011", for PCT/US 2011/034927 titled "Content Delivery Based on User Terminal Events," to Apple Inc., Aug. 26, 2011.
"International Search Report and Written Opinion of the International Search Authority mailed Jun. 19, 2009", for International Application No. PCT/EP 2008/056069, Jun. 19, 2009.
"International Search Report mailed Mar. 24, 2009", in related PCT International Application No. PCT/EP 2008/063326 (4 pages), Mar. 24, 2009.
"Notice of Allowance dated Apr. 29, 2011", U.S. Appl. No. 11/888,680, Apr. 29, 2011, 13 pages.
"Office Action dated Mar. 31, 2011 issue by the U.S. Patent Office", in related U.S. Appl. No. 12/080,124 (29 pages), Mar. 31, 2011.
"Office Action issued from the USPTO dated Aug. 20, 2009", issued in related U.S. Appl. No. 12/075,593 (14 pages), Aug. 20, 2009.
"Office Action issued Mar. 17, 2010", in related U.S. Appl. No. 12/075,593 (11 pages), Mar. 17, 2010.
"Office Action Issued Oct. 15, 2010 by the U.S. Patent Office", in related U.S. Appl. No. 12/080,124 (28 pages), Oct. 15, 2010.
"U.K. Search Report under Section 17 dated Oct. 23, 2007", in U.K. Application No. 0712280.7, Oct. 23, 2007.
"Written Opinion of the International Searching Authority mailed Mar. 24, 2009 issued from the International Searching Authority", in related PCT International Application No. PCT/EP 2008/063326 (5 pages), Mar. 24, 2009.
"XP002456252—Statement in Accordance with the Notice from the European Patent Office dated Oct. 1, 2007", concerning business methods (OJ Nov. 2007; p. 592-593), Nov. 1, 2007, 592-593.
Hillard, Dustin et al., "Improving Ad Relevance in Sponsored Search", Proceedings of the third ACM international conference on Web search and data mining, WSDM'10, Feb. 4-6, 2010, Session: Ads, pp. 361-369, ACM, New York, New York, USA, 2010., Feb. 4, 2010, 361-369.
Internet Reference, , "Specific Media Behavioral Targeting Index", Specific Media, Inc., Irvine, CA, 2010, Available online at http://www.specificmedia.com/behavioral-targeting.php.
Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.
Mueller, Milton , "Telecommunication Access in Age of Electronic Commerce: Toward a Third-Generation Service Policy", Nov. 1996, HeinOnline, 49. Fed. Comm L.J., Nov. 1, 1996, 655-665.
Perkins, Ed , "When to buy airfare", http://www.smartertrael.com/travel-advice/when-to-buy-airfare.html?id=1628038, Nov. 21, 2006 (4 pages), Nov. 21, 2006.

(56) References Cited

OTHER PUBLICATIONS

Regelson, Moira et al., "Predicting Click-Through Rate Using Keyword Clusters", Proceedings of the Second Workshop on Sponsored Search Auctions, EC'06, SSA2, Jun. 11, 2006, ACM, 2006., Jun. 11, 2006.

Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529, ACM, 2007., May 8, 2007, 521-529.

Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010)., Jul. 29, 2009.

"AdWords Reference Guide", Google, 2004.

Ghose, Anindya et al., "An Empirical Analysis of Search Engine Advertising: Sponsored Search in Electronic Markets", Management Science, Informs, 2009.

Karuga, Gilber G. et al., "AdPalette: An Algorithm for Customizing Online Advertisements on the Fly", Decision Support Systems, vol. 32, 2001.

* cited by examiner

SYSTEM, METHOD AND COMPUTER PROGRAM FOR DETERMINING TAGS TO INSERT IN COMMUNICATIONS

CROSS-REFERENCE TO RELATED APPLICATIONS

This application claims priority under 35 USC 119 of U.S. Provisional Patent Application No. 60/999,004 filed Oct. 15, 2007, and U.K. Patent Application GB 0803273.2 filed Feb. 25, 2008, the entire disclosure of each of which is incorporated herein by reference.

FIELD OF THE INVENTION

The present invention relates generally to systems, methods and computer programs to select digital information, such as advertisements, tags or links to deliver to individuals' communications devices.

BACKGROUND INFORMATION

Peer-to-peer and peer-to-group communications, such as Short Message Service (SMS), Multimedia Message Service (MMS), EMS (Enhanced Message Service), e-mail and Instant Messaging (IM), are being used more frequently as a mechanism for delivering advertisements. The term "tagging" is generally used when describing this type of advertising, i.e., a tag is an advertisement which is delivered to users' communication devices using any of the foregoing techniques. The term Tag refers to information added by a service operator, such as MVNO (mobile virtual network operator), MNO (mobile network operator), other $3^{rd}$ party or a sender (e.g. using a suitable application in a sending device to a peer-to-peer, peer-to-group, service-to-peer or service-to-group digital message). The information contained within the Tag could be at least one of the following: part of a an advertisement campaign, a service acquisition message, and information services (news stories, weather, 'What's On', etc.), or any other content.

In particular, the SMS is a universal standard that allows the users of cellular telephones, cable telephones, or other communication devices which support it, to send and receive messages with a text content that can comprise a predetermined maximum number of alphanumerical characters.

In the alphabetical coding system of the European standard GSM, the maximum number of characters is 160, in the Cyrillic standard the maximun number of characters is 140, and with the UCS2 (Turkish, Greek, Arab, Chinese, Thai, etc.) standard the maximun number of characters is 70.

The evolution of SMS has led to EMS, for incorporating in a SMS text message graphics, images, animations and/or sounds.

In this context SMART MESSAGE (SM) is also used, which is a standard developed by Nokia Corporation and universally recognized. SM enables the addition graphical, audio and video content to normal SMS text messages.

Both the SMART MESSAGE and the EMS standards are made linking several SMS to one another.

A Flash Message, also called SMS of class 0, is a special text message, improved from the SMS message. Its content is displayed directly on the display of the mobile phone.

The MMS (Multimedia Messaging Service) is a universal standard that enables the users of mobile phones and other communication devices that support it to send and receive messages with content of text, images, graphics, sounds, audio clips and/or video clips. The structure of the MMS consists of one or more pages or "slides", each containing two regions, one for the text and one for the images. The pages, furthermore, can be timed, and sound can be appended, and they can be displayed. Each page, or slide, has the same layout. The MMS is therefore an extension of the concept of SMS, are MMS messages are typically called multimedia messages.

Concerning SMS, the cost of the messages is typically independent of the length of the text being sent, which only seldom achieves the maximum allowed. Therefore, the user incurs the same cost for a single word as for a long text within the limits. The same applies for a Mobile Virtual Network Operator (MVNO), i.e. MVNO typically pays to Mobile Network Operator (MNO) the same fee per message independent of the length of the text as delivered for MVNO's client. To clarify, a MVNO is a company that provides mobile (sometimes called wireless or cellular) telephone service but does not have its own allocation of the radio frequency spectrum nor all of the infrastructure required to provide mobile telephone service.

The same occurs for other types of the above cited messages, EMS, SMART MESSAGE and MMS, where the cost of the sent message is typically fixed, or calculated for blocks of fixed length, or calculated as packages of delivered data. Therefore, except for rare cases, a residual space not exploited by the user is always present.

The use of unused space within digital communications for advertising use creates a substantial inventory of available (that is, unused) tag space and thus requires a substantial inventory of tags to be used to fill these available tag spaces. Efficient use of this tag inventory with a varied supply of commercially viable tags can be problematic. For SMS tags alone, it is estimated that for every 100,000 mobile users, there are more than 2,000,000 tag spaces available every month. Accordingly, it is a primary concern of mobile operators and advertisers to deliver tags to the users of the service that are relevant, engaging and timely.

To this end, "House Ads" are frequently used by mobile operators and are a set of advertisements that promote the mobile operator itself. However, the mobile operator is then unable to directly obtain revenue from the advertisements, tags, links as would occur if a party other than the mobile operator were utilizing this unused available space.

SUMMARY OF THE INVENTION

The present invention enables selection of information such as advertisements, tags, and links to deliver to individuals' communication devices by determining relevant and/or recent url links that may be used as tags when tagging a message, such as SMS or MMS message, being delivered to each user's communication device. The search for relevant and/or recent links is tailored to the users who are sending/receiving the message and is designed to consider several factors including, but not limited to, profile information concerning either the recipient of the communication or, when no information is known about the recipient, the sender of the communication, any commercial relationship between the mobile operator and mobile internet service providers, suitability of a site to mobile internet access generally or based on device capability or rate agreement of sender or receiver of the message and the current popularity of a mobile internet site (for instance, an information provider while a major news story is breaking).

BRIEF DESCRIPTION OF THE DRAWINGS

The invention, together with further objects and advantages thereof, may best be understood by reference to the FIG. 1 illustrates an exemplary system embodiment in accordance with the invention.

DETAILED DESCRIPTION

Figure 1:
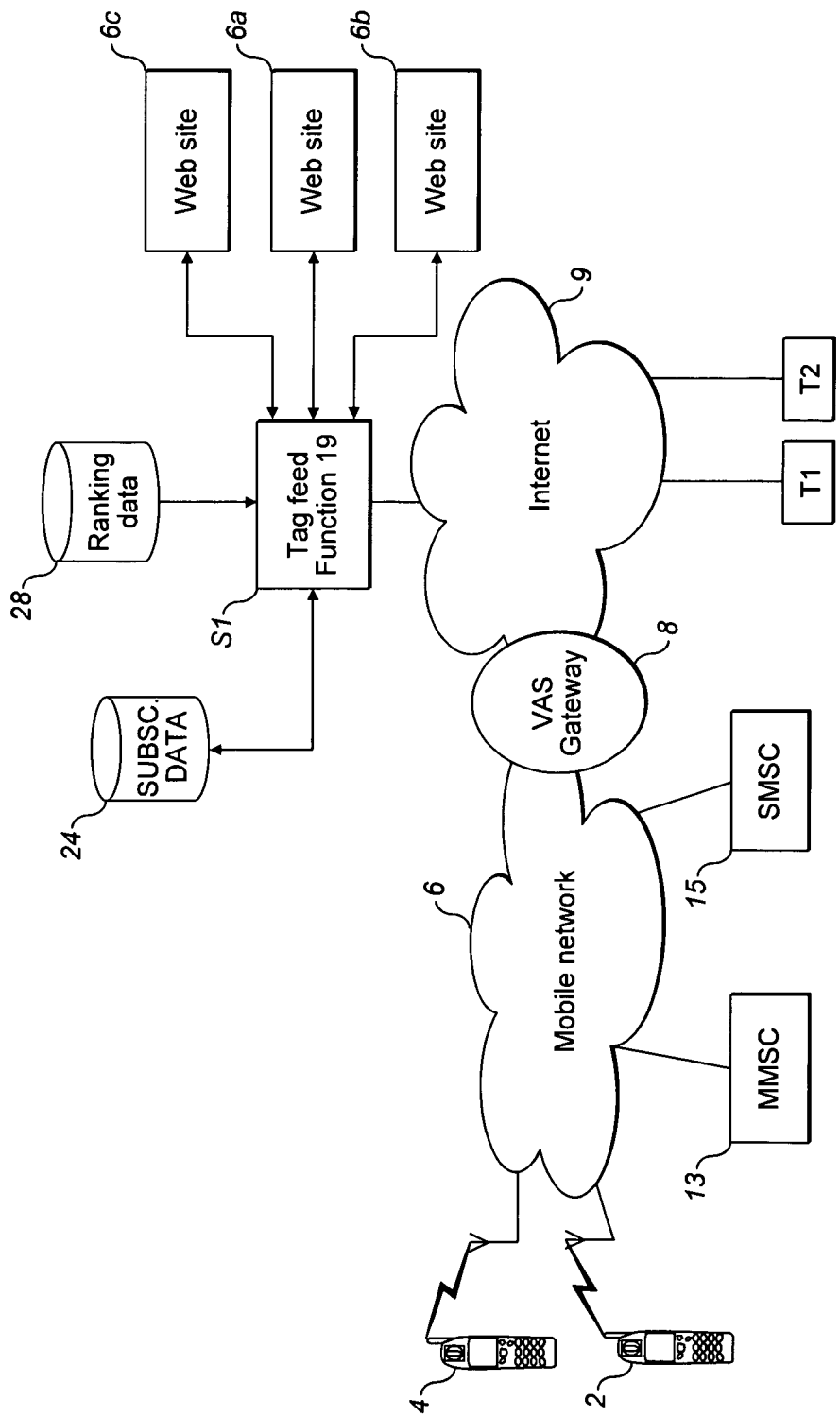
Figure 2:
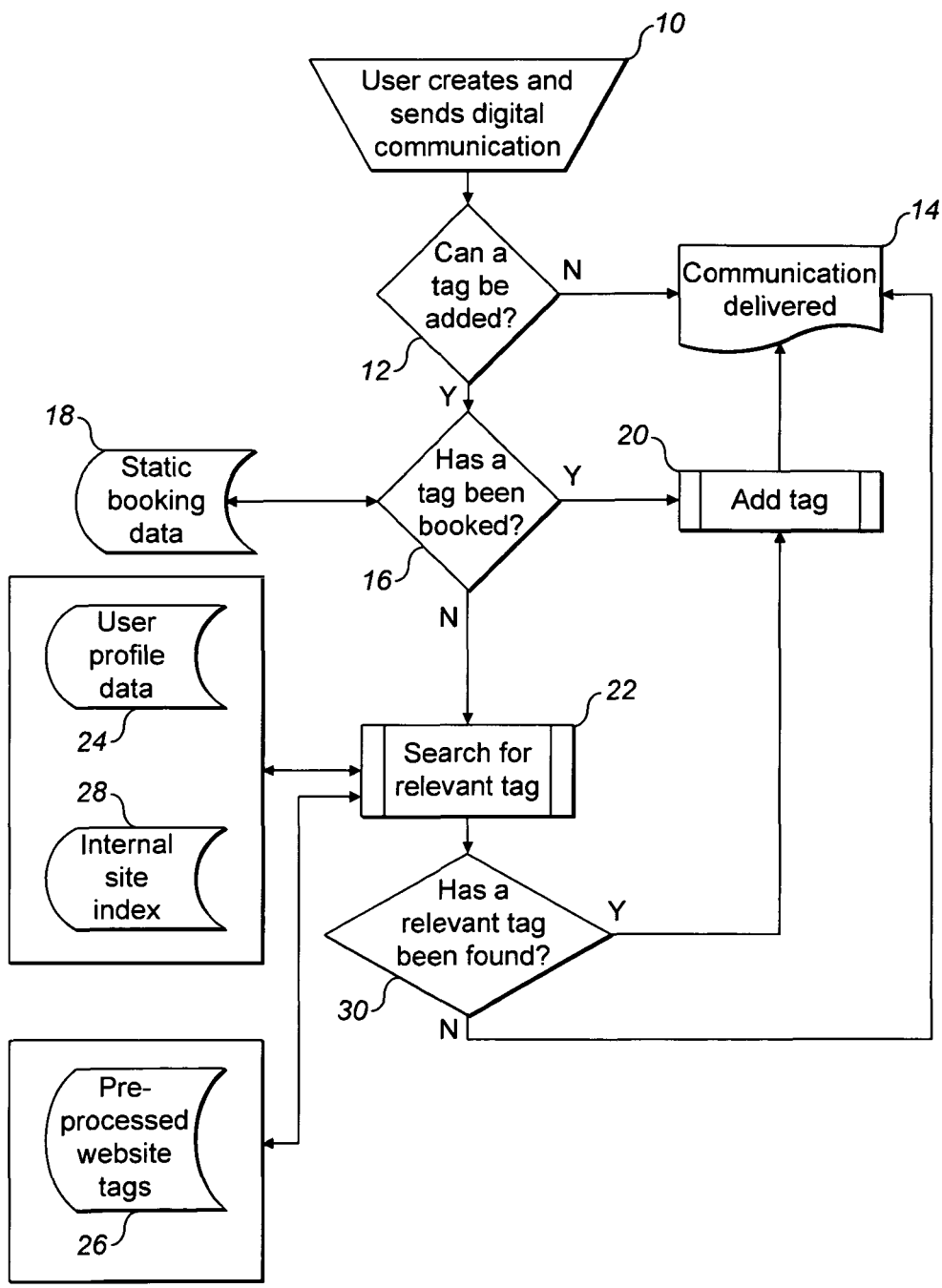
FIG. 2 is a flow chart showing the manner in which the system and method in accordance with the invention fill unused inventory of allocatable tag spaces in messages being delivered to communication devices.

Referring to the accompanying drawings wherein the same reference numerals refer to the same or similar elements, FIG. 2 is a flow chart showing the manner in which the system and method in accordance with some embodiments of the invention fill unused inventory of tag spaces in messages being delivered to communication devices.

The first step 10 is for a user to create and send a digital communication, e.g., a message such as a SMS message, to another user's communication device. Then, this communication is analyzed to determine whether it can be modified to include a tag, or otherwise have a tag associated therewith 12. The analysis of the digital communication to determine whether the message can be modified to include additional information such as advertisements, tags or links and how the modification can be implemented is disclosed in U.S. application Ser. No. 10/555,543 entitled Messaging System and Service which was filed on Mar. 6, 2006, the entire disclosure of which is incorporated herein by reference. If not, then the communication is delivered to the user's device without modification 14, i.e., without an associated tag. However, if the message is determined to allow for inclusion or insertion of a tag, then a determination is made as to whether there is a tag in the inventory of tags 16, e.g., tags from advertisers who have paid to have tags delivered to individuals. This stage is performed by communicating with a database containing tag booking data 18. If there is an available and relevant tag, then one of the tags from the inventory is placed within the communication 20 and the communication is delivered to the individual's communication device 14. Selection of a particular tag to place within the communication may be based on the profile of the individual, the content of the communication, and other known parameters for targeting advertisements to individuals.

If there are no tags in the inventory, which is usually indicative of insufficient tags having been received for the allocatable spaces for the individuals for a given period of time, then a tag feed function is invoked to search for one or more links to include within or otherwise associate with the communication 22. In one embodiment of the invention, even if a tag is selected from an inventory of tags, this tag may be agreed to with an advertiser to be a tag wherein factual content is selected by doing a search according to the invention from the advertiser's web page or from other sources agreed to with the advertiser. This embodiment enables dynamic tags with factual content which is decided upon (selected) just before adding the tag. The search may be performed based on, for example, profile information available concerning the recipient of the communication (possibly contained in one or more user profile databases 24), profile information concerning the sender of the communication, especially if no information (no profile data) is available concerning the recipient but such profile information exists concerning the sender (also possibly contained in database 24), any commercial relationship between the mobile operator managing the individual's communication device and a mobile internet service provider possibly contained in a preferred partner database 26, suitability of a site to mobile internet access generally or based on device capability or rate agreement of the sender or receiver of the message, and the current popularity of a mobile internet site, possibly determined from an internet site index 28. A determination is made as to whether a relevant information to be included in the message has been found 30. Once a relevant information such as an advertisement, link or tag has been found it is inserted within the communication to fill the tag space fully or partly and the communication is delivered 14. It should be noted that a tag is not always something that can be found as such, but it corresponds, for example, to a relevant website, (e.g. a web page having a news about a celebrity buying a new dog). Thereafter a tag is created by creating a link to the site with short description of the link/site. It should also be noted that the length of tag, (i.e. number of characters used for a link and to describe it) is defined based on number of space left in a message (i.e. number of unused space in the message). This size can be used as one selection criteria when selecting a link for tagging (if there is limited amount of characters left then sites with short link to it may be preferred User profile information may be generated from, for example, preferences (information, likes/dislikes and interests) provided by the user, information regarding purchases made by the user when using the communication system, internet searches conducted when using the communication system, subjects of and information conveyed when sending text messages and emails when using the communication system, and previous advertisements, tags, and/or messages sent from the communication service provider that the user has/has not responded to, among others.

Examples of the manner in which the system and method in accordance with the invention identify and place tags into available tag spaces are as follows:

User A of a mobile communications device sends an SMS to user B of a mobile communications device with the text "Going out tonight?". The SMS satisfies conditions that allow a tag to be placed within the message prior to delivery and one is sought from the tag inventory. However, all inventory has been exhausted, i.e., there are no more tags to place within the message, or there are no more relevant tags, i.e., although there are still tags in the tag inventory, none of them are deemed relevant to mobile User B. The tagging service recognizes this and invokes a tag feed function. A search is then made on available internet sites, e.g., mobile internet sites, initially attempting to use profiling information known about the intended recipient of the message (User B). However, in this particular example, no profile information is known so a search is then made of the profile information known about the sender (User A), which information exists. The profile information about User A may be stored in one or more databases managed by the mobile service provider and accessed by the server which includes the computer program which performs the search, e.g., user profile database 24.

Profiling information about User A, from user profile database 24, indicates that the user is an avid sports fan with a history of specific interest in the Manchester United soccer club. A mobile internet search is made based upon this information. The search results identify over 200 references, e.g., links, that may be used. However, one result that is particularly popular is a link to an internet site having a breaking news story that a new player is about to sign with the club (this information being available in the internet site index 28). Coincidentally, the company that runs this particular mobile internet site has a commercial relationship with the mobile operator (of the communications network being used by mobile user B) whereby content sold to their users is subject to a revenue sharing agreement (this relationship being stored in the preferred partner database 26). These factors are therefore considered by the searching program, i.e., the popularity of the site and the commercial relationship, when deciding which result to insert into the message being delivered to mobile user B. As a result of these considerations the search engine determines that the link to this site is to be used to fill the tag space at least partly, and then proceeds to enable delivery of the SMS message from User A to User B with this link.

With reference to the foregoing example, it is foreseen that in one embodiment the internet search is performed only from sites that have a commercial relationship with the service provider (e.g. mobile operator).

Figure 3:
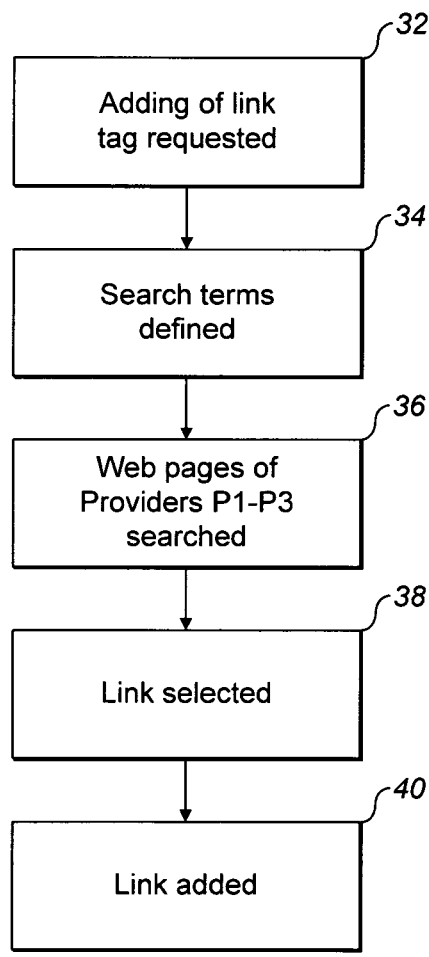
FIG. 3 is a flow chart showing an example of how the system and method in accordance with the invention function.

With reference to FIG. 3, in another example, a tagging entity has made agreements with news/blog/rumor providers P1, P2 and P3 that links to their web page will be added to a message as a tag. The agreement may contain a basic fee for adding a link and another fee for a click-through rate or only a click-through rate is used, or another fixed or variable pricing structure is used. When User A sends a SMS to User B, tag feed functionality is invoked, i.e., the addition of a link tag is requested 32. During this tagging process, a search tool is provided with defined search terms 34 (e.g. based on profile information of the sender or receiver or based on content of the message) and used to search Internet sites (preferably mobile internet sites) of providers P1, P2 and P3 to find the most recent and/or most relevant news or story and a link to the selected provider's site is attached as a tag 36. Relevancy may be based on information about the sender, the receiver, the content of a message, size of unused space of the message and/or the rate agreed with a provider. This embodiment could be used when links are added as tags, i.e., to replace static links with "dynamic links" which are selected based on search and relevancy of the search result. Once a link is selected at 38, it is added to the message at 40.

A computer program may be arranged to perform all of the steps shown in FIGS. 2 and 3. For example, a computer program may be designed to monitor communications to determine whether a tag can be inserted, whether a tag has been booked, whether the size of the unused space of the message permits the addition of a tag and what the size of the tag can be, search for a relevant tag, determine whether a relevant tag has been found, add the tag and continue with or enable the delivery of the modified communication. This program could interact with the tag booking data which may be maintained in a database operated or managed by an advertisement management system operator or the mobile service operator. The program would also interact with the various databases and indexes which provide data about the recipient and/or sender of the communication, data about commercial relationships which may affect the determination of links to include in communications and data about popularity of internet sites.

This computer program may be resident on computer-readable media. Computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention.

The invention claimed is:

1. A method comprising:
   receiving, by a processor, a communication being transmitted to a receiving device, the communication including a first content;
   determining, by the processor, that a tag can be inserted within the communication, wherein the tag is an advertisement comprising a selectable link to content different than the first content with a short description of the selectable link;
   checking an available inventory of tags for a tag relevant to the first communication;
   upon a determination that there is no tag relevant to the communication within the available inventory of tags, creating, by the processor, a new tag relevant to the communication, wherein the new tag is different than the tags in the available inventory of tags and the new tag is created by:
      analyzing at least one of the first content, profile data about a receiving user of the communication and profile data about a sending user of the communication to determine a search topic;
      searching on at least one web site that has a commercial relationship with an operator managing communications to the receiving device, for content based upon the search topic, the search resulting in at least one search result;
      selecting one of the resulting search results; and
      creating both a link to the selected search result and a description of the selected search result to comprise the new tag;
   inserting, by the processor, the new tag into the communication; and
   transmitting, by the processor, the communication including the new tag inserted into the communication to the receiving device.

2. The method of claim 1, wherein selecting a search result is based upon a determined popularity of the search result.

3. The method of claim 1, further comprising:
   determining a number of unused spaces in the communication.

4. The method of claim 3, wherein selecting one of the resulting search results comprises:
   selecting a search result with a link size that does not exceed the determined number of unused spaces in the communication.

5. The method of claim 3, wherein creating both a link to the selected search result and a description of the selected search result is based upon the determined number of unused spaces in the communication so that the size of both the created link and description do not exceed the determined number of unused spaces in the communication.

6. The method of claim 1, further comprising:
delivering the communication to the receiving device.

7. The method of claim 1, wherein the analyzing comprises first analyzing profile data about the receiving user and, upon a determination that profile data about the receiving user is not available, analyzing profile data about the sending user.

8. The method of claim 1, wherein the analyzing comprises searching a user profile database containing data about the receiving user and the sending user.

9. The method of claim 1, wherein the searching on at least one web site that has a commercial relationship with the operator comprises searching at least one preferred partner database containing data about the commercial relationship.

10. The method of claim 9, wherein the data about the commercial relationship includes data about a rate for placement of a tag by an Internet service provider.

11. The method of claim 2, wherein the popularity of the search result is determined by searching an Internet site index.

12. The method of claim 1, wherein the recipient device is a mobile device.

13. The method of claim 1, wherein the communication is received at least partly over a mobile or cellular network.

14. The method of claim 1, wherein the communication is a SMS or MMS message.

15. A non-transitory computer-readable medium containing instruction which, when execute by a computing device, cause the computing device to perform the steps of:
receiving a communication being transmitted to a receiving device, the communication including a first content;
determining that a tag can be inserted within the communication, wherein the tag is an advertisement comprising a selectable link to content different than the first content with a short description of the selectable link;
checking an available inventory of tags for a tag relevant to the first communication;
upon a determination that there is no tag relevant to the communication within the available inventory of tags, creating a new tag relevant to the communication, wherein the new tag is different than the tags in the available inventory of tags and the new tag is created by:
analyzing at least one of the first content, profile data about a receiving user of the communication and profile data about a sending user of the communication to determine a search topic;
searching on at least one web site that has a commercial relationship with an operator managing communications to the receiving device, for content based upon the search topic, the search resulting in at least one search result;
selecting one of the resulting search results; and
creating both a link to the selected search result and a description of the selected search result to comprise a new tag;
inserting the new tag into the communication;
transmitting the communication including the new tag inserted into the communication to the receiving device.

16. The non-transitory computer-readable medium of claim 15, wherein selecting one of the resulting search results is based upon a determined popularity of the search result.

17. The non-transitory computer-readable medium of claim 15, wherein creating the new tag further comprises:
determining a number of unused spaces in the communication.

18. The non-transitory computer-readable medium of claim 17, wherein selecting one of the resulting search results comprises:
selecting a search result with a link size that does not exceed the determined number of unused spaces in the communication.

19. The non-transitory computer-readable medium of claim 17, wherein creating both a link to the selected search result and a description of the selected search result is based upon the determined number of unused spaces in the communication so that the size of both the created link and description do not exceed the determined number of unused spaces in the communication.

20. The non-transitory computer-readable medium of claim 15, further comprising instructions which, when executed by a computing device, cause the computing device to perform the steps of:
delivering the communication to the receiving device.

21. The non-transitory computer-readable medium of claim 15, wherein the analyzing comprises first analyzing profile data about the receiving user and, upon a determination that profile data about the receiving user is not available, analyzing profile data about the sending user.

22. The non-transitory computer-readable medium of claim 15, wherein the analyzing comprises searching a user profile database containing data about the receiving user and the sending user.

23. The non-transitory computer-readable medium of claim 15, wherein the searching on at least one web site that has a commercial relationship with the operator comprises searching at least one preferred partner database containing data about the commercial relationship.

24. The non-transitory computer-readable medium of claim 23, wherein the data about the commercial relationship includes data about a rate for placement of a tag by an Internet service provider.

25. The non-transitory computer-readable medium of claim 16, wherein the popularity of the search result is determined by searching an Internet site index.

26. The non-transitory computer-readable medium of claim 15, wherein the recipient device is a mobile device.

27. The non-transitory computer-readable medium of claim 15, wherein the communication is received at least partly over a mobile or cellular network.

28. The non-transitory computer-readable medium of claim 15, wherein the communication is a SMS or MMS message.

29. A system comprising:
a processor; and
a memory containing instructions that, when executed, cause the processor to:
receive a communication being transmitted to a receiving device;
determine that a tag can be inserted within the communication, wherein the tag is an advertisement comprising a selectable link to content different than the first content with a short description of the selectable link;
check an available inventory of tags for a tag relevant to the first communication;
upon a determination that there is no tag relevant to the communication within the available inventory of tags, create a new tag relevant to the communication, wherein the new tag is different than the tags in the available inventory of tags and the new tag is created by:
analyzing at least one of the first content, profile data about a receiving user of the communication and profile data about a sending user of the communication to determine a search topic;

searching on at least one web site that has a commercial relationship with an operator managing communications to the receiving device, for content based upon the search topic, the search resulting in at least one search result;

selecting one of the resulting search results; and creating both a link to the selected search result and a description of the selected search result to comprise a new tag;

insert the new tag into the communication; and transmit the communication including the new tag inserted into the communication to the receiving device.

30. The system of claim 29, wherein selecting one of the resulting search results is based upon a determined popularity of the search result.

31. The system of claim 29, wherein creating the new tag further comprises:

determining a number of unused spaces in the communication.

32. The system of claim 31, wherein selecting one of the resulting search results comprises:

selecting a search result with a link size that does not exceed the determined number of unused spaces in the communication.

33. The system of claim 31, wherein creating both a link to the selected search result and a description of the selected search result is based upon the determined number of unused spaces in the communication so that the size of both the created link and description do not exceed the determined number of unused spaces in the communication.

34. The system of claim 29, wherein the instructions further cause the processor to:

deliver the communication to the receiving device.

35. The system of claim 29, wherein the analyzing comprises first analyzing profile data about the receiving user and, upon a determination that profile data about the receiving user is not available, analyzing profile data about the sending user.

36. The system of claim 29, wherein the analyzing comprises searching a user profile database containing data about the receiving user and the sending user.

37. The system of claim 29, wherein the searching on at least one web site that has a commercial relationship with the operator comprises:

searching at least one preferred partner database containing data about the commercial relationship.

38. The system of claim 37, wherein the data about the commercial relationship includes data about a rate for placement of a tag by an Internet service provider.

39. The system of claim 30, wherein the popularity of the search result is determined by searching an Internet site index.

40. The system of claim 29, wherein the recipient device is a mobile device.

41. The system of claim 29, wherein the communication is received at least partly over a mobile or cellular network.

42. The system of claim 29, wherein the communication is a SMS or MMS message.

* * * * *